United States Patent [19]

Konishi

[11] 4,263,517
[45] Apr. 21, 1981

[54] CONTROL METHOD AND SYSTEM FOR AN HIGH VOLTAGE DIRECT CURRENT SYSTEM

[75] Inventor: Hiroo Konishi, Ibaraki, Japan
[73] Assignee: Hitachi, Ltd., Japan
[21] Appl. No.: 8,482
[22] Filed: Feb. 1, 1979

[30] Foreign Application Priority Data

Feb. 10, 1978 [JP] Japan .................................. 53/13468

[51] Int. Cl.³ ............................................. H02J 3/36
[52] U.S. Cl. ...................................... 307/82; 307/85; 307/151; 363/35
[58] Field of Search ....................... 307/43, 23, 64, 80, 307/82, 85, 87; 363/35, 37, 51

[56] References Cited

U.S. PATENT DOCUMENTS

| | | | |
|---|---|---|---|
| 3,487,286 | 12/1969 | Persson | 363/35 |
| 3,883,790 | 5/1975 | Hammarlund | 363/35 |
| 3,906,335 | 9/1975 | Watanabe | 363/35 |
| 3,962,625 | 6/1976 | Juhlin | 363/35 |
| 4,173,780 | 11/1979 | Häusler | 363/35 |

Primary Examiner—Donald A. Griffin
Assistant Examiner—S. D. Schreyer
Attorney, Agent, or Firm—Craig and Antonelli

[57] ABSTRACT

A HVDC system has two converter stations, each of which has two converters connected in cascade to operate as a rectifier or an inverter and the stations are connected through a d.c. power transmission line to each other and are connected to respective a.c. power sources through the a.c. power transmission lines. Each converter is controlled depending on the difference between a current reference for the HVDC system and an actual current flowing in the HVDC system when the converter operates as a rectifier, and controlled depending on the output of the constant margin angle control circuit when the converter operates as an inverter. When the converter operation condition is changed, i.e. another converter operates in addition to the converters in operation or the direction of power transmission in the HVDC system is changed, the current reference for the HVDC system is reduced depending on the d.c. voltage during a predetermined period.

14 Claims, 11 Drawing Figures

CONTROL METHOD AND SYSTEM FOR AN HIGH VOLTAGE DIRECT CURRENT SYSTEM

BACKGROUND OF THE INVENTION

The present invention relates to a control method and system for an high voltage direct current (hereinafter referred to as "HVDC") system.

In a large HVDC system, a converter station comprises converters connected in cascade. Under a certain operation mode where only one or two of the converters operate and the remaining converters are bypassed by a corresponding suitable switch, it is necessary for another converter(s) out of operation to operate in addition to the operating converter(s) in accordance with some request, for example, a demand for an increase in transmitted power in the HVDC system. On the contrary, under another operation mode where all the converters operate normally, it is necessary for one or two of the converters to be bypassed by a corresponding suitable switch in accordance with some requests, for example, a demand for a decrease in transmitted power in the HVDC system.

Under another mode, for example, when a HVDC system is operating normally, it is necessary for the direction of power transmission in the HVDC system to be changed in accordance with a command given by a central control station.

When the above modes occurred, the values of the control angles given to the converters which are to take part in operation of the HVDC system or are to be changed from a rectifier operation to an inverter operation or vice versa, are changed to the suitable value of the control angles through 90°. Ordinarily when a converter is in operation at the control angle value near 90°, the converter requires very large reactive power as is well known. In case that the converter is connected to a weak a.c. system, therefore, the a.c. voltage of the converter decreases. This causes unstableness or inoperativeness of the converter operation of the HVDC system.

To prevent the unstableness or inoperativeness of the converter operation, therefore, it is necessary for the converter station of the HVDC system connected to the weak A.C. system to be provided with an excessive compensation apparatus which supplies reactive power to the converter. For example, by the conventional control method or system, the capacity of the compensation apparatus is determined as follows.

CASE 1

When both the A.C. systems connected to the HVDC system are large in capacity compared with the HVDC system, the capacity of the compensation apparatus is about 60% of the capacity of HVDC system ordinarily.

CASE 2

When one of the A.C. systems connected to the HVDC system is weak compared with the capacity of the HVDC system, the capacity of the compensation apparatus is about 112% of the capacity of the HVDC system.

Because, in case 2, the reactive power which is necessary to operate the converter is not supplied fully from the weak A.C system, the capacity of the compensation apparatus in case 2 is much larger than that in case 1.

This means that the conventional method and system require large initial cost to construct the HVDC system. Further, under normal operation, since the reactive power required is smaller than the capacity of the compensation apparatus, a utilization factor of the compensation apparatus is small.

SUMMARY OF THE INVENTION

One of the objects of the present invention is to provide an improved control method and system for an HVDC system which can suppress an increase of reactive power required by converters when an operation mode of the HVDC system is changed. Another object of the present invention is to provide a control method and system free from the drawbacks of the conventional HVDC system mentioned above.

The present invention is characterized in that a value of reference current for converters is reduced when an operation mode of the HVDC system is changed.

According to the present invention, under the operation mode of the HVDC system is changing, since the current reference of the converter is reduced, the reactive power required by the converter is reduced. This means that the capacity of the compensation apparatus required for the converter station to operate is smaller than that of the conventional system. Then, the utilization factor of the compensation apparatus is improved and the initial cost of the construction of the converter station is less than that of the conventional system.

The object mentioned above and the other and advantages of the present invention will become more apparent from the following detailed description of the preferred embodiments given by reference to the accompanying drawings.

DETAILED DESCRIPTION OF THE PREFERRED EMBODIMENTS

Figure 1:
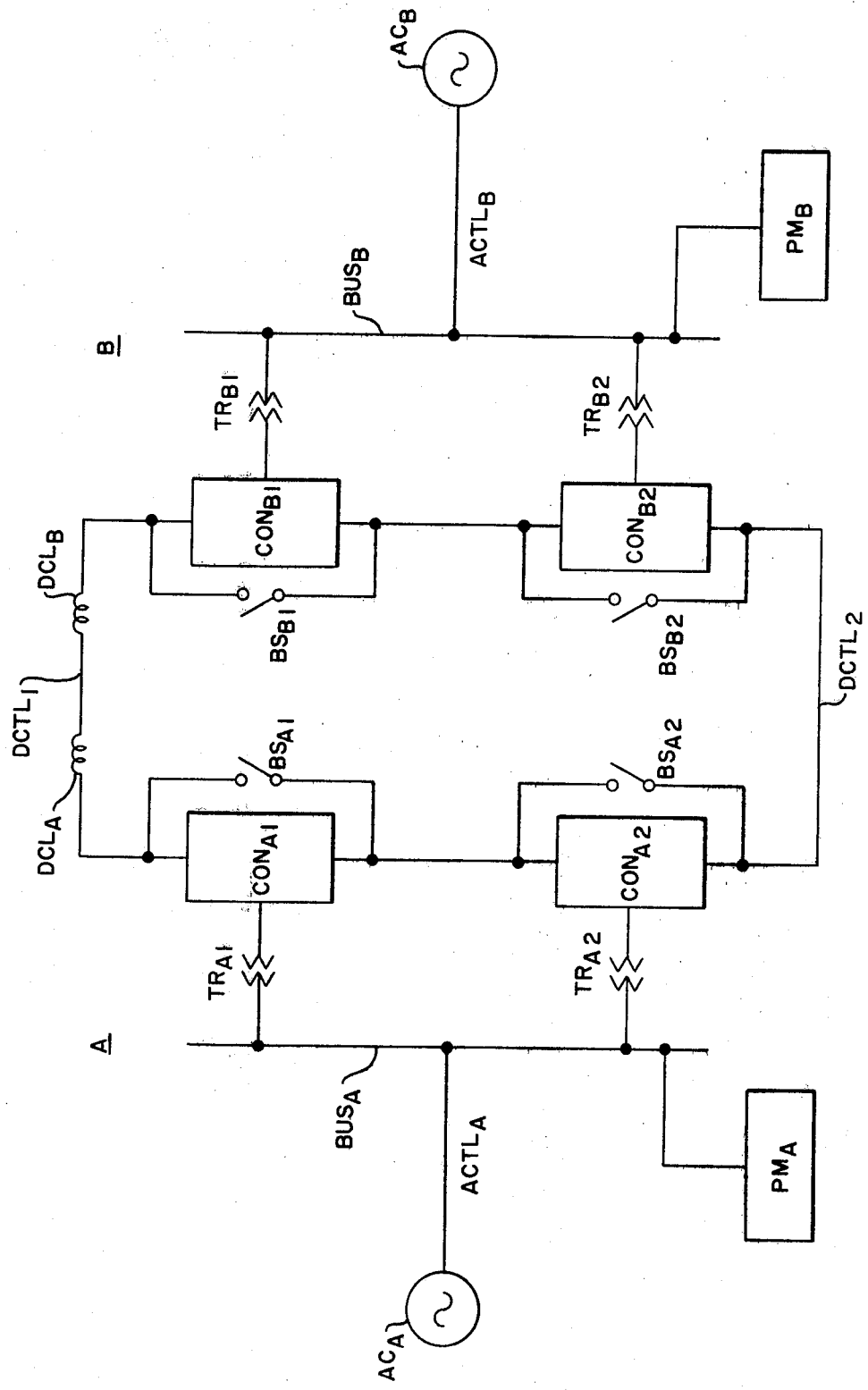
FIG. 1 shows a schematic block diagram of a conventional HVDC system.

Before description of the present invention, a conventional HVDC system to which the present invention may be adopted is explained referring to FIG. 1. In the Figure, A and B designate two converter stations that are similar in the construction to each other. $BUS_A$ and $BUS_B$ designate a.c. bus bars. $AC_A$ and $AC_B$ designate a.c. power sources. $ACTL_A$ and $ACTL_B$ designate a.c. transmission lines both ends of which are connected to a.c. bus bars $BUS_A$, $BUS_B$ and a.c. power sources $AC_A$, $AC_B$ respectively. $PM_A$ and $PM_B$ designate phase modifiers which are connected to the a.c. bus bars $BUS_A$ and $BUS_B$ respectively and furnish reactive power. $TR_{A1}$, $TR_{A2}$ and $TR_{B1}$, $TR_{B2}$ designate transformers which are connected to the a.c. bus bars $BUS_A$ and $BUS_B$ respectively. $CON_{A1}$ and $CON_{A2}$, and $CON_{B1}$ and $CON_{B2}$ designate converters which are energized by the transformers $TR_{A1}$ and $TR_{A2}$, and $TR_{B1}$ and $TR_{B2}$ respectively. The converters $CON_{A1}$ and $COBN_{A2}$ are connected in series and operate as rectifiers or inverters. $BS_{A1}$, $BS_{A2}$, $BS_{B1}$ and $BS_{B2}$ designate bypass switches which are connected to the corresponding converters in parallel and are closed when the corresponding converters do not operate as rectifiers or inverters. $DCL_A$ and $DCL_B$ designate d.c. reactors one end of each of which is connected to the corresponding converter. $DCTL_1$ and $DCTL_2$ designate d.c. power transmission lines, the former of which is connected between ends of the d.c. reactors $DCL_A$ and $DCL_B$ and the latter of which is connected between the converters $CON_{A2}$ and $CON_{B2}$.

The power of the a.c. source $AC_A$ is transmitted through the a.c. transmission line $ACTL_A$, the a.c. bus bar $BUS_A$ and the transformers $TR_{A1}$ and $TR_{A2}$ to the converters $CON_{A1}$ and $CON_{A2}$ operating as rectifiers. The power converted from a.c. to d.c. by the converters $CON_{A1}$ and $CON_{A2}$ are transmitted through the d.c. reactor $DCL_A$, the d.c. transmission line $DCTL_1$, the d.c. reactor $DCL_B$ and the d.c. transmission line $DCTL_2$ to the converters $CON_{B1}$ and $CON_{B2}$ operating as inverters. The power converted from d.c. to a.c. by the converters $CON_{B1}$ and $CON_{B2}$ is transmitted through the transformers $TR_{B1}$ and $TR_{B2}$, the a.c. bus bar $BUS_B$ and the a.c. transmission line $ACTL_B$ to the a.c. power source $AC_B$. The reactive powers required by the converters $CON_{A1}$ and $CON_{A2}$, and $CON_{B1}$ and $CON_{B2}$ are provided almost by the a.c. sources $AC_A$ and $AC_B$ respectively. The rest of the reactive powers are provided by the phase modifiers $PM_A$ and $PM_B$, and the capacities thereof are determined by the capacities of the converters and the strength of the a.c. power system.

Figure 2:
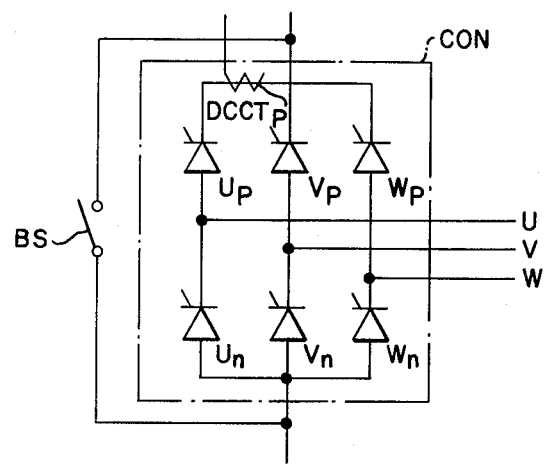
FIG. 2 shows an example of a circit of a converter and a bypass switch in FIG. 1.

As one example of the converters used in the system shown in FIG. 1, the details of the converter CON are described hereinafter. In FIG. 2, the converter CON has three series-connections of thyristors, each of which is connected in parallel to one another and is provided for the respective three-phase power U, V and W. These three series-connections of thyristors are composed of the respective pairs of thyristors Up and Un, Vp and Vn and Wp and Wn, each pair of thyristors being connected in series in same direction. And, one of the three series-connections of thyristors, for example the series-connection of thyristors Up and Un, has a d.c. current transformer DCPTp which is provided for detecting the fact that the pair of the thyristors Up and Un are operating as a bypass pair.

Now let it be supposed that the HVDC system operates at half of full capacity thereof, namely the bypass switches $BS_{A2}$ and $BS_{B2}$ are closed and only the converters $CON_{A1}$ and $CON_{B1}$ operate as a rectifier or an inverter. When the converters $CON_{A2}$ and $CON_{B2}$ take part in the operation of the HVDC system, first the converters $CON_{A2}$ and $CON_{B2}$ are given gate signals for their thyristors Up and Un in order to make the thyristers Up and Un a bypass pair. The d.c. current bypassed over the bypass switches $BS_{A2}$ and $BS_{B2}$, flows through the bypass pair formed by the thyristers Up and Un. Thereafter, the converters $CON_{A2}$ and $CON_{B2}$ are given gate signals which operate the converters $CON_{A2}$ and $CON_{B2}$ as a rectifier or an inverter. To avoid abrupt change of the d.c. current in the HVDC system, the value of control angle of the gate signal should be gradually changed during a suitable period from 90° to required value for operation as a rectifier or an inverter.

Another condition requirement is that the direction of the power transmission in the HVDC system may be changed. That is, a command which requires the converter station A to operate as an inverter station and the other converter B as a rectifier station is given, while the converter station A operates as a rectifier station and the other converter station B as an inverter station. According to the command, the value of control angle for the converter of the converter station A is changed from a value suitable for operation as a rectifier to a value suitable for operation as an inverter over the value of 90°. At the same time, control angle for the converter of the converter station B is also changed in the same way as mentioned above, and the converter operates as a rectifier.

As is described previously, when the value of control angle for the converter is near 90°, the converter requires a very large reactive power. If the a.c. system is weak, the a.c. system can not fully provide such large reactive power. In other words, when such large reactive power flows in the weak a.c. system, the a.c. voltage of the converter decrease largely. This means that the HVDC system can not operate stably.

As is described before, the one of the objects of the present invention is to remove the problem of the conventional control method and system for an HVDC system.

Figure 3:
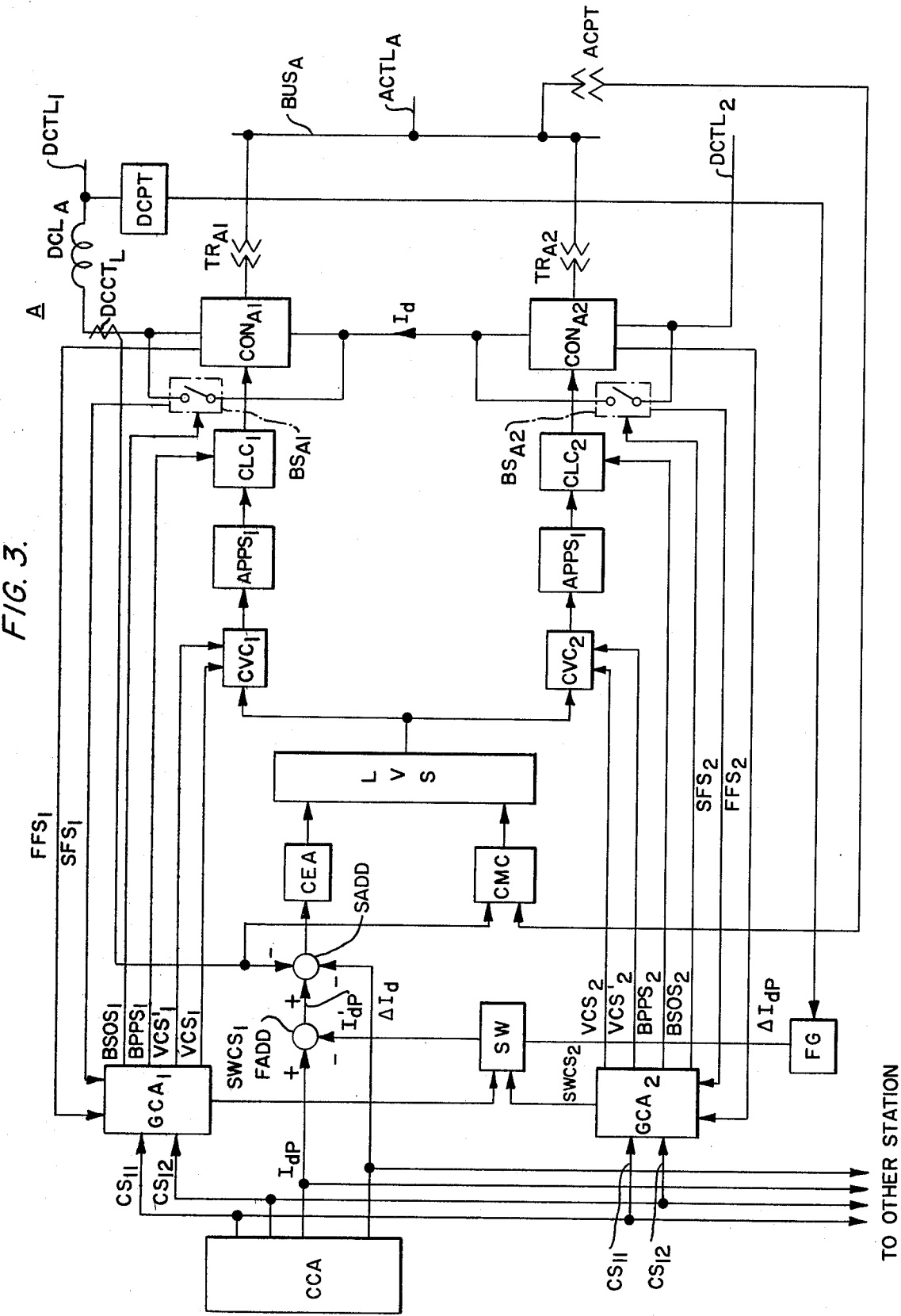
FIG. 3 shows a schematic block diagram of an embodiment of the present invention.

FIG. 3 shows a schematic blockdiagram of an embodiment of the converter station A constructed according to the present invention, in which like elements are designated by like symbols as shown in FIG. 2. Since some elements are provided for the respective converters $CON_{A1}$ and $CON_{A2}$ and carry out the same functions, these elements are designated like symbols and are distinguished by attached numerals 1 and 2. The numerals are attached only if necessary for the discrimination between the converters $CON_{A1}$ and $CON_{A2}$. CCA designates a central control apparatus which gives some command signals $CS_{11}$ and $CS_{12}$ and some reference signals Idp and ΔId. GCA designates a group control apparatus which gives some sequential control signals VSC, VCS', BPPS, BSOS and SWCS when the command signals $CS_{11}$ and $CS_{12}$ are given by the CCA. CVC designates a control voltage limit circuit which gives a suitable limit of the control voltage for the converter and changes the limit when the control signals VCS or VCS' are given by the GCA. APPS designates an automatic pulse phase shifter which gives gate signals to the thyristers of the converter depending on the control voltage given by the CVC. CLC designates a control logic circuit which controls the gate signal given by the APPS when the control signal BPPS is given by the GCA. FADD and SADD designate first and second adders each of which adds signals applied thereto according to the polarity thereof. CEA designates a current error amplifier which amplifies the output of the SADD at a suitable gain. CMC designates a constant margin angle control circuit which calculates a margin angle of the converter depending on the value of the d.c. current Id in the HVDC system and the a.c. voltage Vac of the a.c. system and provides the voltage representing the margin angle. LVS designates a low voltage selecter which selects smaller one of the outputs of the CEA and CMC in the value and provides the output. FG designates a function generator which provides a signal $\Delta Idp$, the value of which is determined depending on a predetermined relation of the d.c. voltage of the HVDC system. SW designates a switching control circuit which passes the signal $\Delta Idp$ from the FG to the negative input terminal of the FADD when the control signal SWCS is given by the GCA. $DCCT_L$ designates a d.c. current transformer which detects the value of the d.c. current Id flowing in the HVDC system. DCPT designates a d.c. potential transformer which detects the d.c. voltage of the HVDC system. ACPT designates an a.c. potential transformer which detects the a.c. voltage Vac of the a.c. system.

Under normal operation, if the converter station A is required to operate as a rectifier station, the converter $CON_A$ operates as a rectifier depending on the difference between the reference signal Idp given by the central control apparatus CCA and the signal Id given by the d.c. current transformer $DCCT_L$. Namely, under normal operation, the switching control circuit SW inhibits the output $\Delta Idp$ produced by the function generator FG from being applied to the first adder FADD. A current margin signal $\Delta Id$ is not given to the second adder SADD because the converter station A operates as the rectifier station. In this case, as is well known, the output of the current error amplifier CEA is smaller than the output of the constant margin angle control circuit CMC. The low voltage selecter LVS selects the output of the CEA and provides it. The output of the LVS passes the control voltage limit circuit CVC to the automatic pulse phase shifter APPS in condition that the control signals VCS and VCS' are not given by the group control apparatus GCA and the corresponding converter is in operation. If the corresponding converter is out of operation, the CVC provides the control voltage which most nearly corresponds to the angle 90° regardless of the signal of the LVS. Since the control logic circuit CLC is not given the control signal BPPS, the gate signals produced by the APPS passes the CLC and are given to the converter $CON_A$.

If the converter station A operates as an inverter station, the margin angle for a commutation of the converter $CON_A$ is maintained constant in order to avoid a commutation failure in the same manner as mentioned above. The control angle of the converter is controlled depending on the output of the constant margin angle control circuit CMC. In this case, of course the current margin signal $\Delta Id$ is given to the second adder SADD.

Let it be supposed that the converter station A and B operate as a rectifier station and an inverter station, respectively. The converters $CON_{A1}$ and $CON_{B1}$ operate as a rectifier and an inverter, respectively. The converters $CON_{A2}$ and $CON_{B2}$ are out of operation and the d.c. current in the HVDC system bypasses the $CON_{A2}$ and $CON_{B2}$ through the bypass switches $BS_{A2}$ and $BS_{B2}$. Then further suppose that the command signal $CS_{11}$, which means that the converters $CON_{A2}$ and $CON_{B2}$ should be taking part in operation of HVDC system, is given by the central control apparatus CCA.

Figure 4:
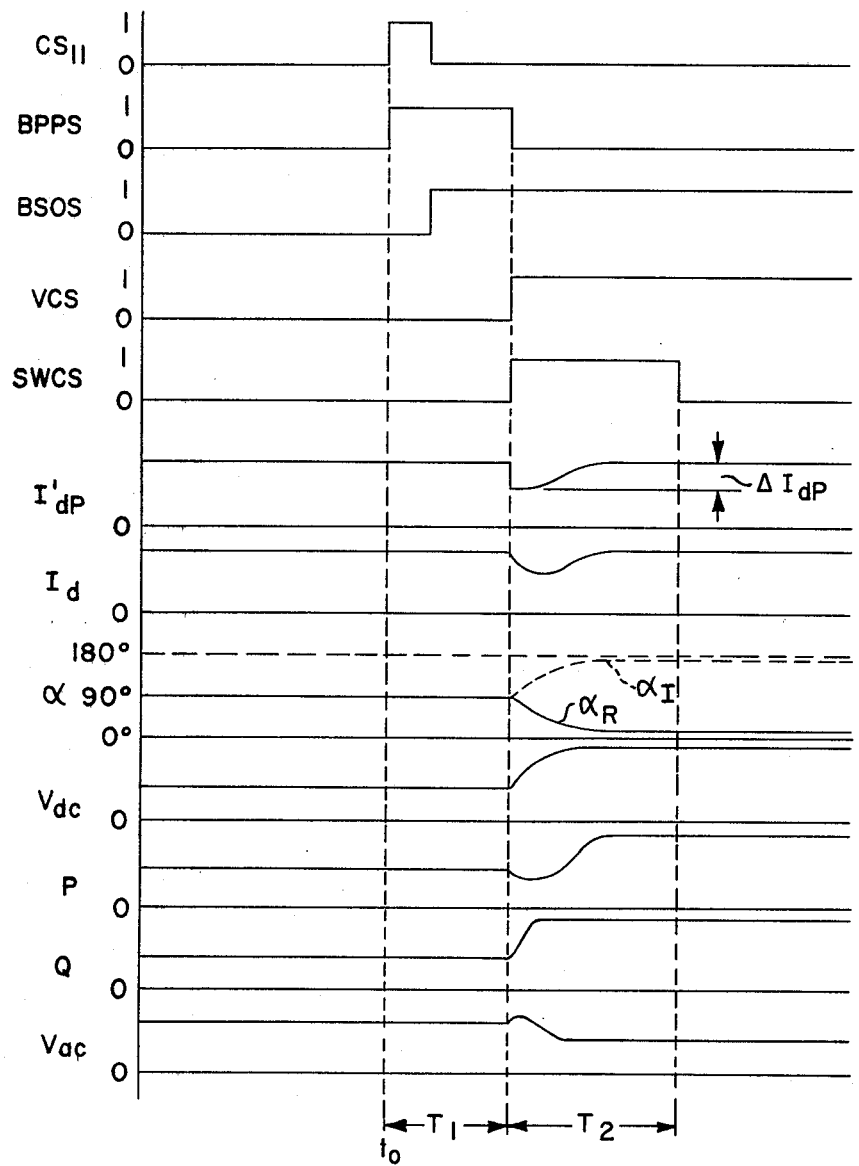
FIG. 4 shows waveforms of various signals and outputs in the HVDC system for better understanding of an operation of the present invention, when two converters operate in addition to the operating convertes in accordance with a command signal of increasing of transmitted power in the HVDC system.

The operation of the present invention is described referring to FIG. 4 which shows waveforms of signals in the HVDC system, where the description is made only about the station A because the station B is similar to the station A in operation.

The command signal $CS_{11}$ is given to the group control apparatuses $GCA_1$ and $GCA_2$. In the $GCA_1$, the signal $CS_{11}$ is neglected because the converter $CON_{A1}$ already operates as a rectifier. In the $GCA_2$, a bypass pair signal $BPPS_2$ is made according to the signal $CS_{11}$ and given to the control logic circuit $CLC_2$. In the $CLC_2$, the gate signals given by the automatic pulse phase shifter $APPS_2$ are made to be furnished to only the thyristers Up and Un (refer to FIG. 2). A portion of the current flowing in by bypass switch $BS_{A2}$, therefore, flows through the bypass pair circuit formed by the thyristers Up and Un in series. The output of the d.c. current transformer DCCT means that the bypass pair circuit is in operation, and is fed back to the group control apparatus $GCA_2$ as a first feedback signal $FFS_2$. After getting the signal $FFS_2$, the $GCA_2$ gives an open signal $BSOS_2$ to the bypass switch $BS_{A2}$. When the $BS_{A2}$ is opened, a second feedback signal $SFS_2$ is given from the $BS_{A2}$ to the $GCA_2$. The $GCA_2$ produces a voltage control signal $VCS_2$ and a switching control signal $SWCS_2$ under the condition that the bypass pair signal $BPPS_2$ ends and after the second feedback signal $SFS_2$ is received. When the signal $VCS_2$ is given to the control voltage limit circuit $CVC_2$, the limit of the control voltage for the $APPS_2$ is gradually changed during a suitable period from the value corresponding to 90° to an allowable value for the converter $CON_{A2}$ to operate as rectifier. While the output of the low voltage selecter LVS is smaller than the limit, the automatic pulse phase shifter $APPS_2$ gives the gate signals of the control angle, the value of which is depending on the limit given by the $CVC_2$ regardless of the output of the LVS to the converter $CON_{A2}$. When the limit becomes equal to or smaller than the output of the LVS, the $APPS_2$ gives the gate signals of a specific control angle, the value of which depends upon the output of the LVS to the converter $CON_{A2}$. At the same time when the control signal $VCS_2$ is provided, the control signal $SWCS_2$ is provided and the signal $SWCS_2$ extinguished after the predetermind period. When the signal $SWCS_2$ is given to the switching control circuit SW by the group control apparatus $GCA_2$, the signal $\Delta Idp$ of the output of the function generator FG is given to the negative input terminal of the FADD and the d.c. current reference Idp the positive terminal thereof. The reference Idp, therefore, is reduced to I'dp by the signal $\Delta Idp$. Since the FG generates the signal $\Delta Idp$, the value of which is determined in predetermined relation to the d.c. voaltage Vdc of the HVDC system given by the d.c. potential transformer $DCPT_L$, the d.c. current reference of the HVDC system is reduced by the value which is corresponding to the d.c. voltage Vdc of the HVDC system when the converter $CON_{A2}$ operates according to the command signal $CS_{11}$. Namely, according to the present invention, the d.c. current Id flowing in the HVDC system is reduced when the converter $CON_{A2}$ starts its operation and while the control angle for the converter $CON_{A2}$ is large. This means that the reactive power required by the HVDC system is suppressed when the converter $CON_{A2}$ starts the operation, because the reactive power depends on the value of d.c. current flowing in the HVDC system. In other words, according to the present invention, the HVDC system operates stably if the HVDC system is connected to a weak a.c. system.

In FIG. 4, outputs P and Q show an active and a reactive power in the HVDC system, respectively. An output α shows a limit of control angle of the converter $CON_{A2}$ controlled by the control voltage limit circuit $CVC_2$, wherein $α_R$ shows the control angle limit in case that the converter station A operates as a rectifier station and the converter $CON_{A2}$ as a rectifier, and $α_I$ indicated by a broken line shows the control angle limit in case that the converter station A operates as an inverter station and the converter CON as an inverter.

At the time $T_0$, the command signal $CS_{11}$ is given. The periods $T_1$ and $T_2$ are preset by the operation of the group control apparatus GCA.

Figure 5:
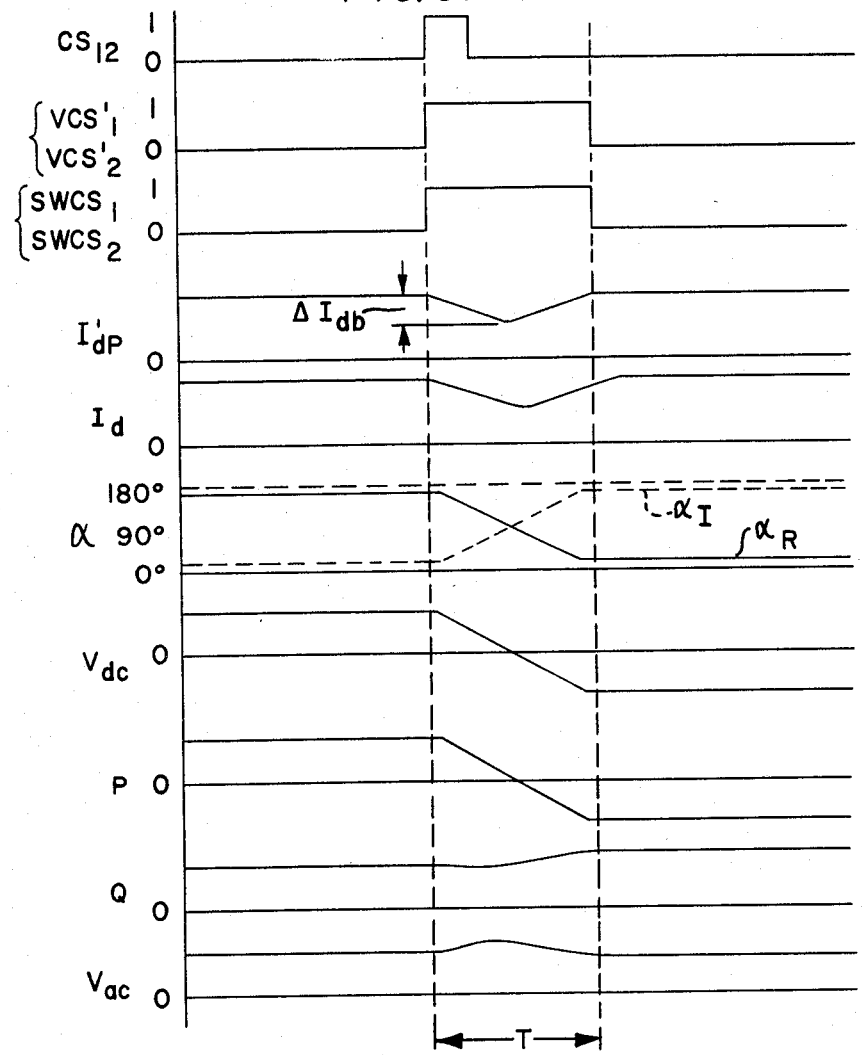
FIG. 5 shows waveforms of various signals and outputs in the HVDC system for better understanding of another operation of the present invention, when a direction of power transmission of a HVDC system is changed.

Another mode of operation of the present invention, that is when a change of the direction of power transmission in the HVDC system is required, is described below, referring to FIG. 5. In the figure, the description is given only about operation of the station A.

Let it be supposed that the converter stations A and B operate as a rectifier station and an inverter station, respectively. All converters $CON_{A1}$, $CON_{A2}$, $CON_{B1}$ and $CON_{B2}$ operate as rectifiers or inverters corresponding to the station A or B. Then further suppose that the command signal $CS_{12}$ is given, which means that the converter stations A and B operate as an inverter station and a rectifier station respectively. Namely, by reversing the operation of the stations A and B, the change of the direction of the power transmission is commanded.

The command signal $CS_{12}$ is given to the group control apparatuses $GCA_1$ and $GCA_2$. The $GCA_1$ and $GCA_2$ provide voltage control signals $VCS_1'$ and $VCS_2'$ and switching control signals $SWCS_1$ and $SWCS_2$, during a predetermined period T according to the command signal $CS_{12}$. Where, if the converter $CON_{A1}$ or $CON_{A2}$ is out of operation and the d.c. current flowing in the HVDC system flows the bypass switch $BS_{A1}$ or $BS_{A2}$. The $GCA_1$ or $GCA_2$ neglects the command signal $CS_{12}$ and the signals corresponding to the $GCA_1$ or $GCA_2$ are not provided. When the signals $VCS_1'$ and $VCS_2'$ are given to the control voltage limit circuits $CVC_1$ and $CVC_2$, respectively, the limits of the control voltages given to the automatic pulse phase shifters $APPS_1$ and $APPS_2$ are gradually changed during a suitable period, which is smaller than the period T, from a value allowable for the converters $CON_{A1}$ and $CON_{A2}$ to operate as rectifiers to a value allowable for the converters $CON_{A1}$ and $CON_{A2}$ to operate as inverters. While the output of the low voltage selector LVS is larger than the limit, the automatic pulse phase shifters $APPS_1$ and $APPS_2$ give the gate signals of the control angle depending on the limits given by the $CVC_1$ and $CVC_2$ regardless of the output of the LVS to the converters $CON_{A1}$ and $CON_{A2}$. When the limit becomes equal to or larger than the output of the LVS, the $APPS_1$ and $APPS_2$ give the gate signals of control angle depending on the output of the LVS to the converters $CON_{A1}$ and $CON_{A2}$. If the converter station A operates as an inverter station, the relations among the $APPS_1$ and $APPS_2$, the limits of the $CVC_1$ and $CVC_2$ and the output of the LVS are similar to the above. The reduction of the d.c. current reference for the HVDC system when the signals $SWCS_1$ and $SWCS_2$ are given to the switching control circuit SW, is achieved in a similar manner to that of the case previously mentioned. The current margin signal ΔId is given to the second adder SADD by the central control apparatus CCA at the same time when the command signal $CS_{12}$ is provided.

If the converter station A operates as an inverter station, the current margin signal ΔId is removed from the SADD at the same time.

In this case, according to the present invention, a reactive power required by the converters is also suppressed, and the HVDC system operates stably because the d.c. current Id flowing the HVDC system is reduced during the period in which the operation mode of the HVDC system is changing.

Figure 6:
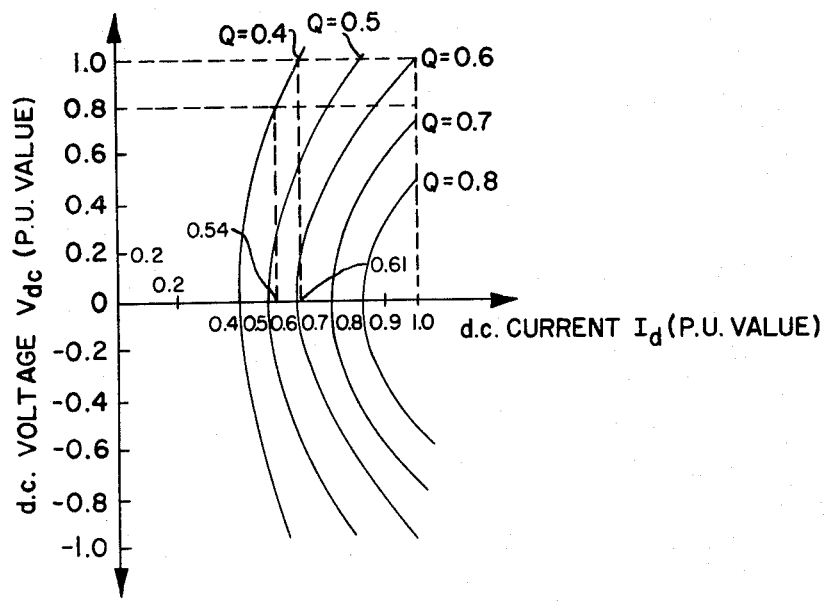
FIG. 6 shows an example of characteristic curves of a function generator which is used in the HVDC system shown in FIG. 3.

FIG. 6 shows an example of characteristic curves for embodying the present invention. FIG. 6 shows a relation between the d.c. voltage Vdc and the d.c. current Id in the HVDC system when the required reactive power Q is selected as a parameter, wherein a vertical axis is the d.c. voltage Vdc and a horizontal axis is the d.c. current Id. All of the Q, Vdc and Id are shown by the per unit value (hereinafter referred to as P.U. value). The characteristic curves shown in FIG. 6 means that the HVDC system requires the reactive power Q of 0.6 P.U. value when the HVDC system normally operates on the condition that the d.c. voltage Vdc and the d.c. current Id both are 1.0 P.U. value. If the d.c. current Id is reduced to 0.61 P.U. value, the required reactive power is reduced to 0.4 P.U. value under operation of 1.0 P.U. value of the d.c. voltage Vdc. While, if the d.c. voltage Vdc equals 0.8 P.U. value and the d.c. current Id equals 1.0 P.U. value under normal operation, the required reactive power is reduced to 0.4 P.U. value when the d.c. current Id is reduced to 0.54 P.U. value. The function generator FG produces the output ΔIdp which represents of the amount of the d.c. current Id to be reduced required in order to maintain the d.c. voltage Vdc when the required reactive power Q changes. When the reactive power required by the HVDC system is selected as the parameter, the relation between the d.c. voltage Vdc and the d.c. current Id is predetermined depending on the construction of the HVDC system and is preset by the function generator FG.

Figure 7:
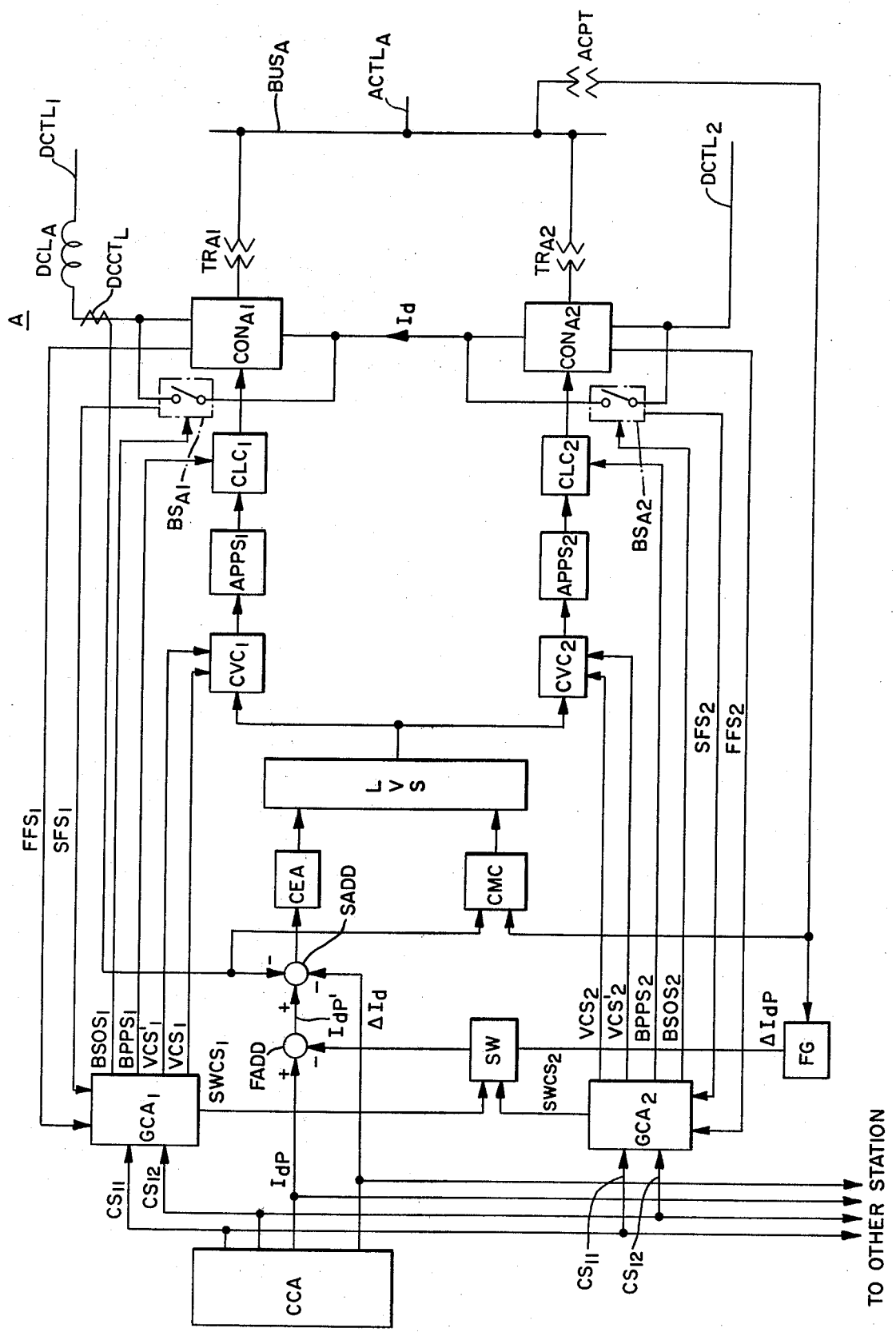
FIGS. 7 to 9 show schematic block diagrams of another embodiments of the present invention.

FIG. 7 shows a schematic block diagram of another embodiment of the present invention. The embodiment shown in FIG. 7 is the same as that of FIG. 3 except that the input of the function generator FG is an output of the a.c. potential transformer ACPT. As is well known, the d.c. voltage of the HVDC system corresponds to the a.c. voltage of the a.c. bus bar $BUS_A$ under normal operation. Therefore, both embodiments produce substantially the same effects.

Figure 8:
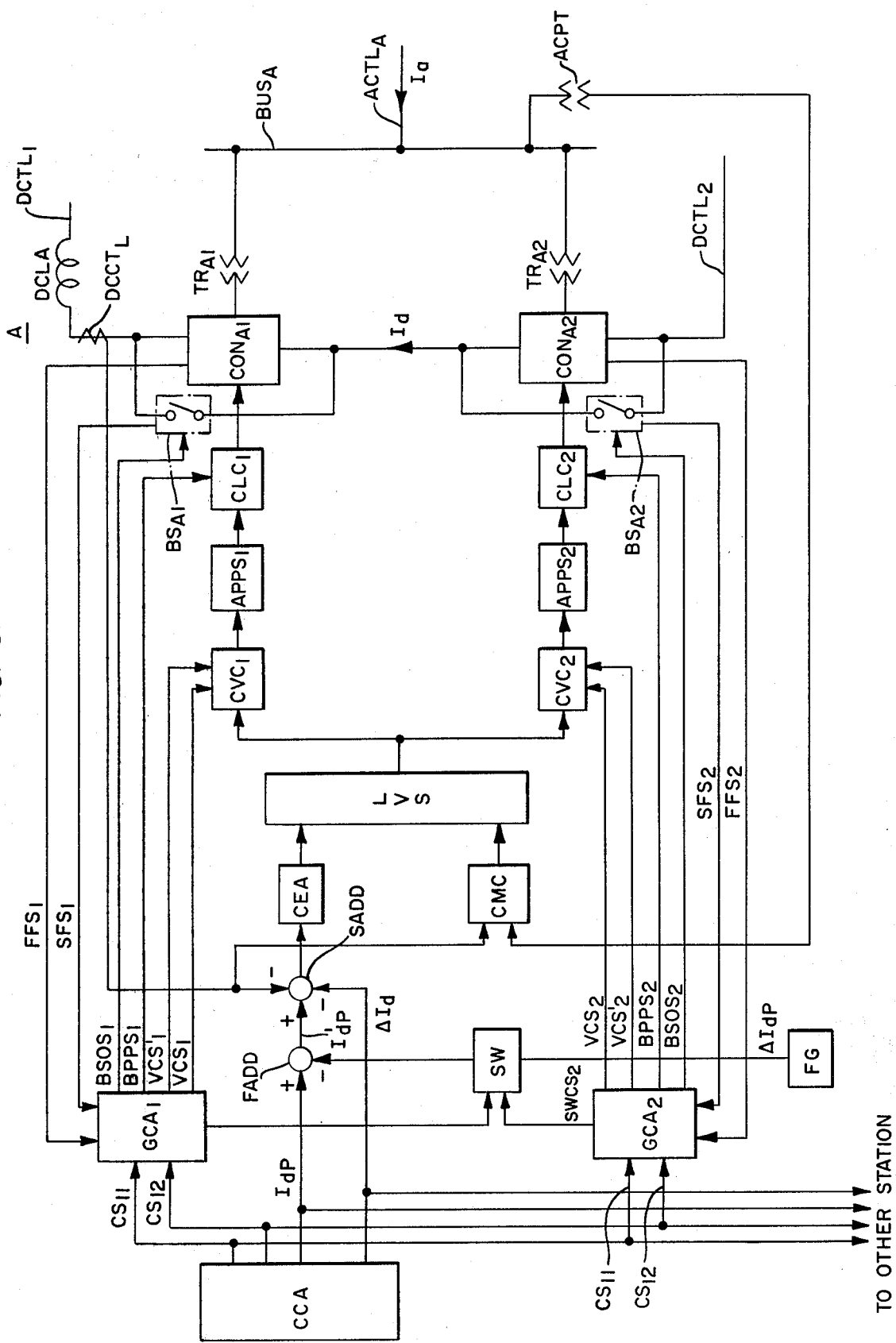

FIG. 8 shows a schematic block diagram of another embodiment of the present invention. The embodiment shown in FIG. 8 is same as the embodiment shown in FIG. 3 except that the function generator FG has no input signal. In this embodiment, the FG provides a constant signal ΔIdp regardless of the d.c. voltage Vdc or the a.c. voltage Vac. Because one of the objects of the present invention is the reduction of the d.c. current reference for the HVDC system when the operation mode of the HVDC system is changed, this embodiment produces substantially the same effect except that there is no adjustment of the change in the a.c. voltage of the converters depending on the HVDC system operation condition.

Figure 9:
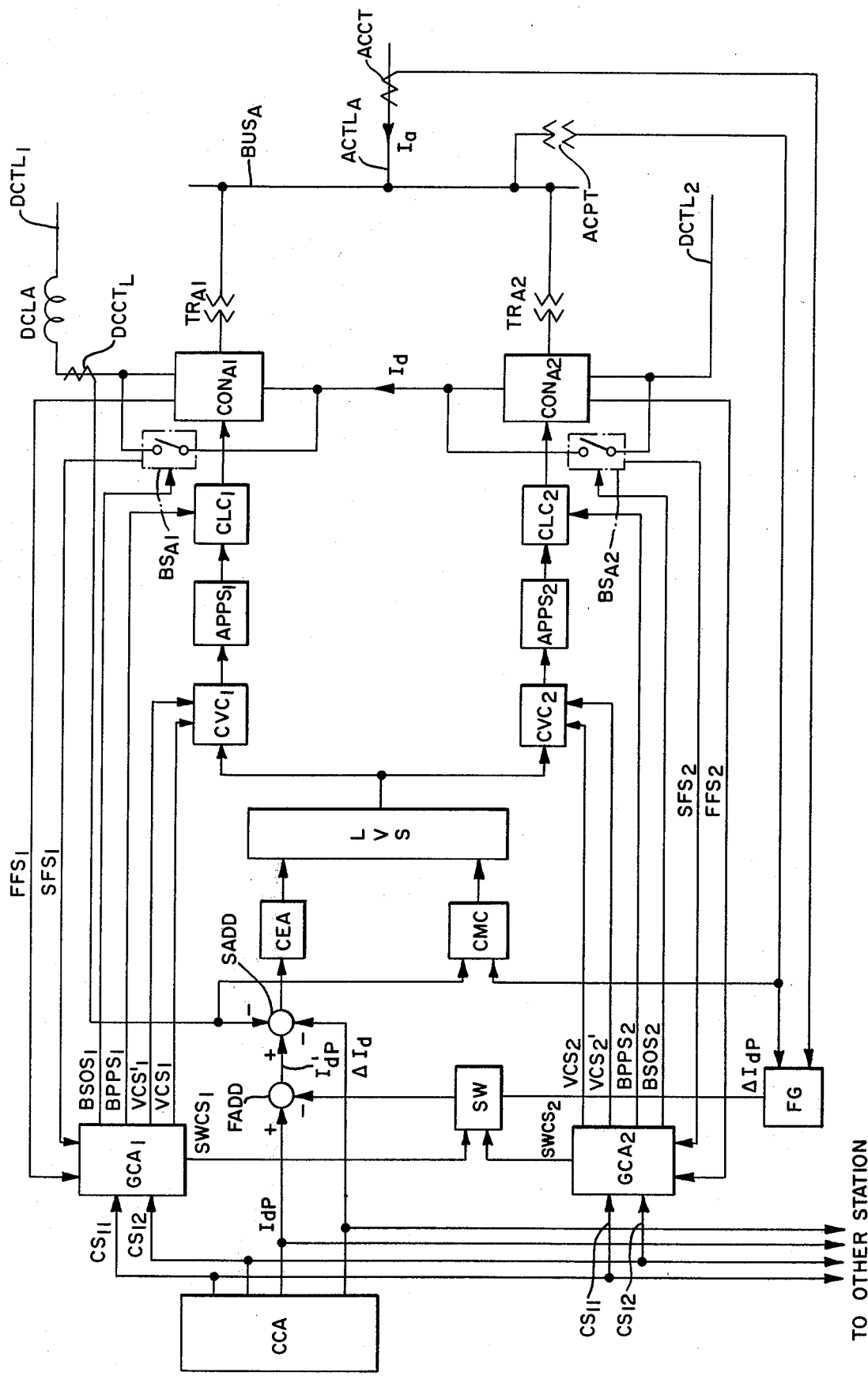

FIG. 9 shows a schematic block diagram of another embodiment of the present invention. The embodiment shown in FIG. 9 is same as the embodiment shown in FIG. 3 except that the inputs of the function generator FG are the a.c. voltage Vac and the value of the a.c. current, the value of which represents the amount of the a.c. current flowing through the a.c. transmission line ACTL$_4$. In this embodiment, the FG calculates a reactive power spended in the HVDC system depending on the a.c. voltage Vac and the value of the a.c. current Ia and produces a signal ΔIdp depending on the reactive power. This embodiment reduces the current reference for the HVDC system in order to maintain a constant reactive power when the operation condition of the HVDC system is changed and produces like effects of the other embodiment.

Figure 10:
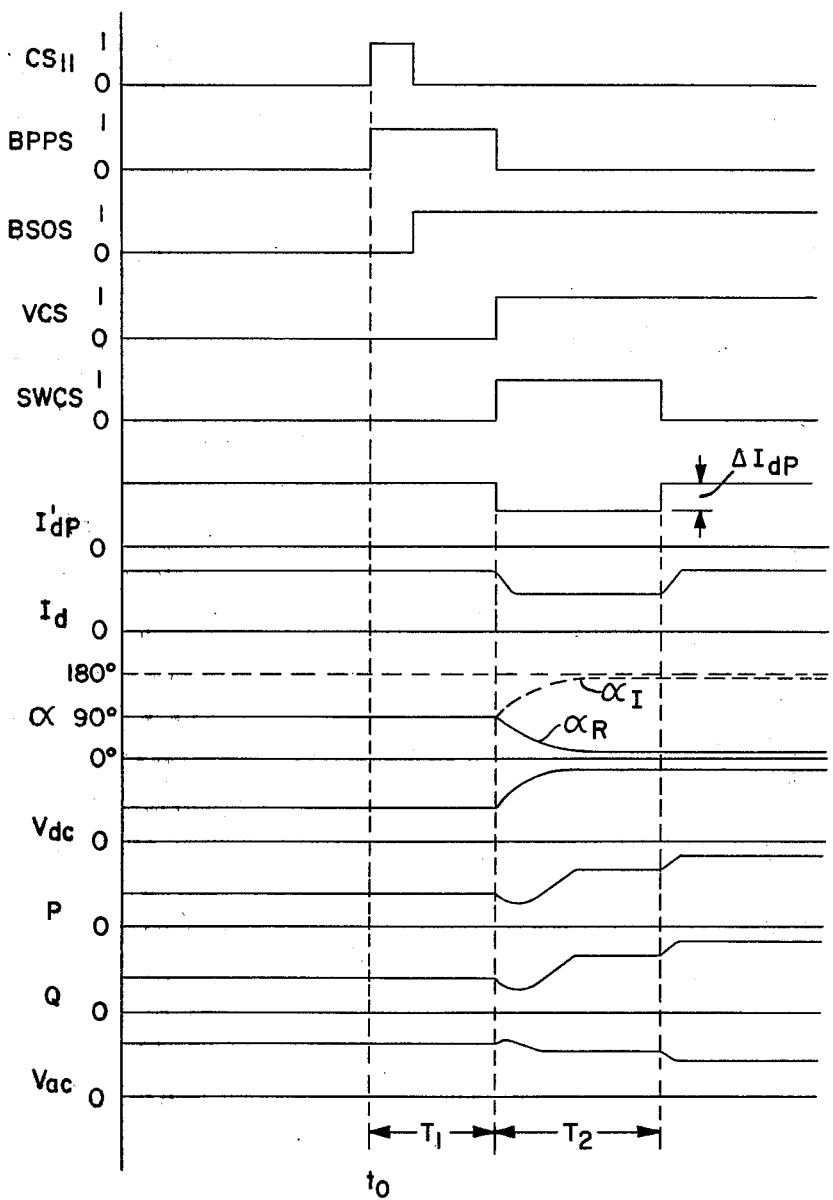
FIGS. 10 and 11 show waveforms of various signals and outputs in the HVDC system when the embodiment shown in FIG. 8 are adopted.
Figure 11:
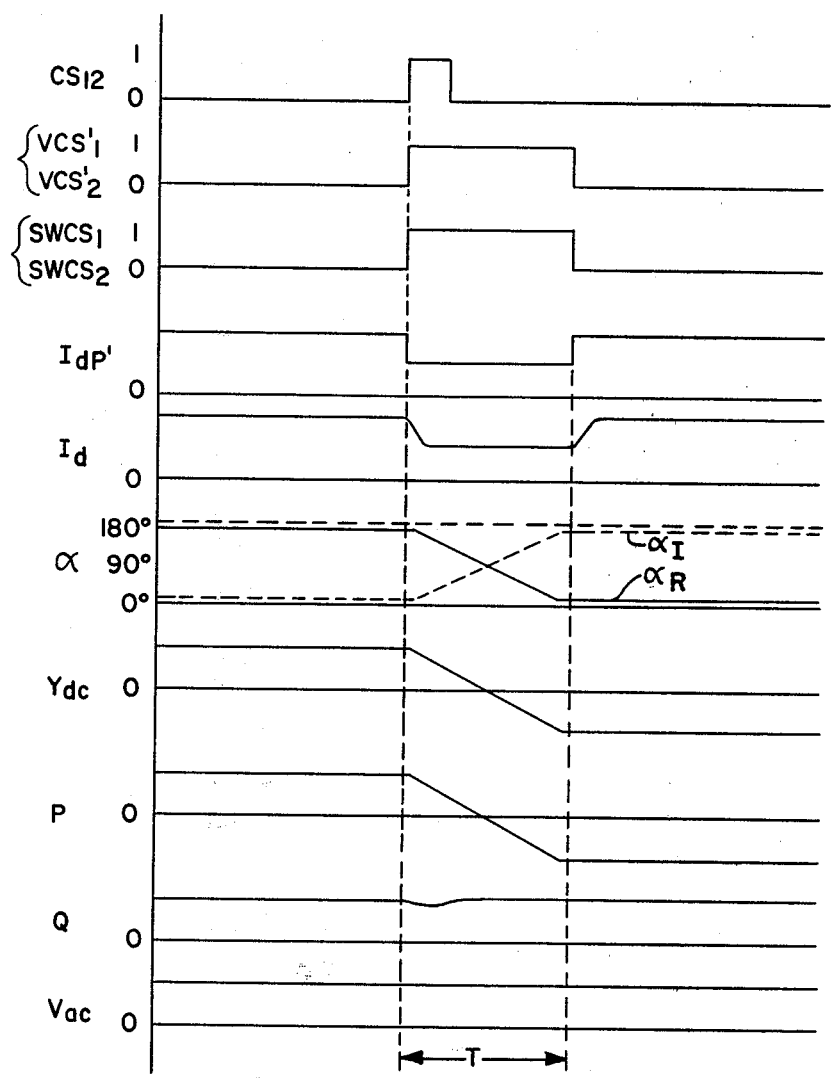

FIG. 10 and 11 show waveforms of various signals and outputs in the HVDC system when the embodiment shown in FIG. 8 are adopted, wherein FIG. 10 is the case that one converter take part in the operation to the other converter is in operation and FIG. 11 is the case that the direction of power transmission is changed.

I claim:

1. A control method for a high voltage direct current system transmitting electric power from one a.c. source to another a.c. source and having at least two converter stations comprising:
    converting a.c. power from the one a.c. source into d.c. power in at least one of said converter stations;
    transmitting said converted d.c. power to the other converter station;
    converting said transmitted d.c. power into a.c. power in said other converter station;
    controlling said a.c.-to-d.c. conversion of said at least one converter station depending on a difference between a d.c. current reference and a real d.c. current flowing in the high voltage direct current system; and
    controlling said d.c.-to-a.c. conversion of said other converter station so as to maintain a constant margin angle of commutation; and
characterized by
    reducing the d.c. current reference during a predetermined period when the operation mode of the high voltage direct current system is changed.

2. A control method for a high voltage direct current system transmitting electric power from one source to another source and having at least two converter stations each of which has two converters connected in cascase comprising:
    converting a.c. power from the one a.c. source into d.c. power in at least one of said converter stations;
    transmitting said converted d.c. power to the other converter station;
    converting said transmitted d.c. power into a.c. power in said other converter station;
    controlling said a.c.-to-d.c. conversion of said at least one converter station depending on a difference between a d.c. current reference and a real d.c. current flowing in the high voltage direct current system; and
    controlling said d.c.-to-a.c. conversion of said other converter station so as to maintain a constant margin angle of commutation; and
characterized by
    reducing the d.c. current reference during a predetermined period when one converter is required to take part in the operation under the condition that the other converter is already operating normally.

3. A control method for a high voltage direct current system transmitting electric power from one a.c. source to another a.c. source and having at least two converter stations comprising:
    converting a.c. power from one a.c. source into d.c. power in at least one of said converter stations;
    transmitting said converted d.c. power to the other converter station;
    converting said transmitted d.c. power into a.c. power in said other converter station;
    controlling said a.c.-to-d.c. conversion of said at least one converter station depending on a difference between a d.c. current reference and a real d.c. current flowing in the high voltage direct current system; and
    controlling said d.c.-to-a.c. conversion of said other converter station so as to maintain a constant margin angle of commutation; and
characterized by
    reducing the d.c. current reference during a predetermined period when the direction of power transmission of the high voltage direct current system is changed.

4. A control method for a high voltage direct current system according to one of claims 1 to 3 wherein the amount of d.c. current reference reduction is determined depending on the d.c. voltage of the high voltage direct current system when the operation mode thereof is changed.

5. A control method for a high voltage direct current system according to one of claims 1 to 3 wherein the amount of d.c. current reference reduction is determined depending on the a.c. voltage of the one a.c. source when the operation mode of the high voltage direct current system is changed.

6. A control method for a high voltage direct current system according to one of claims 1 to 3 wherein the amount of d.c. current reference reduction is a predetermined value depending on the capacity of the high voltage direct current system and the strength of the one a.c. source when the operation mode of the high voltage direct current system is changed.

7. A control method for a high voltage direct current system according to one of claims 1 to 3 wherein the amount of d.c. current reference reduction is determined depending on the reactive power spent by the high voltage direct current system when the operation mode thereof is changed.

8. A control system for a high voltage direct current system transmitting electric power from one a.c. source to another a.c. source comprising:
    a first converter station for converting a.c. power from the one a.c. source into d.c. power, and having a converter and means for generating a difference signal between a d.c. current reference and a real d.c. current flowing in the high voltage direct current system;
    a second converter station for converting d.c. power into a.c. power, and having a converter and means for generating a margin angle signal of cummutation depending on the a.c. voltage of the a.c. system and the value of real d.c. current flowing in the high voltage direct current system;
    means for transmitting said d.c. power from said first converter station to said second converter station;
    means for controlling said first converter station depending on said difference signal so as to maintain a constant d.c. current flowing in the high voltage direct current system; and
    means for controlling said second converter station depending on said margin angle signal so as to maintain a constant margin angle of commutation; and characterized by means for reducing the d.c. current reference during a predetermined period when the operation mode of the high voltage direct current system is changed.

9. A control system for a high voltage direct current system transmitting electric power from one a.c. source to another a.c. source comprising:
- a first converter station for converting a.c. power from the one a.c. source into d.c. power, and having at least two converters and means for generating a difference signal between a d.c. current reference and a real d.c. current flowing in the high voltage direct current system;
- a second converter station for converting d.c. power into a.c. power, and having at least two converters and means for generating a margin angle signal of commutation depending on the a.c. voltage of the a.c. system and the value of real d.c. current flowing in the high voltage direct current system;
- means for transmitting said d.c. power from said first converter station to said second converter station;
- means for controlling said first converter station depending on said difference signal so as to maintain a constant d.c. current flowing in the high voltage direct current system; and
- means for controlling said second converter station depending on said margin angle signal so as to maintain a constant margin angle of commutation; and characterized by means for reducing the d.c. current reference during a predetermined period when one converter is required to take part in the operation under the condition that the other converter is already operating normally.

10. A control system for a high voltage direct current system transmitting electric power from one a.c. source to another a.c. source comprising:
- a first converter station for converting a.c. power from the one a.c. source into d.c. power, and having a converter and means for generating a difference signal between a d.c. current reference and a real d.c. current flowing in the high voltage direct current system;
- a second converter station for converting d.c. power into a.c. power, and having a converter and means for generating a margin angle signal of commutation depending on the a.c. voltage of the a.c. system and the value of real d.c. current flowing in the high voltage direct current system;
- means for transmitting said d.c. power from said first converter station to said second converter station;
- means for controlling said first converter station depending on said difference signal so as to maintain a constant d.c. current flowing in the high voltage direct current system; and
- means for controlling said second converter station depending on said margin angle signal so as to maintain a constant margin angle of commutation; and characterized by means for reducing the d.c. current reference during a predetermined period when the direction of power transmission of the high voltage direct current system is changed.

11. A control system for a high voltage direct current system according to one of claims 8 to 10 wherein the amount of d.c. current reference reduction is determined depending on the d.c. voltage of the high voltage direct current system when the operation mode thereof is changed.

12. A control system for a high voltage direct current system according to one of claims 8 to 10 wherein the amount of d.c. current reference reduction is determined depending on the a.c. voltage of the one a.c. source when the operation mode of the high voltage direct current system is changed.

13. A control system for a high voltage direct current system according to one of claims 8 to 10 wherein the amount of d.c. current reference reduction is predetermined value depending on the capacity of the high voltage direct current system and the strength of the one a.c. source when the operation mode of the high voltage direct current system is changed.

14. A control system for a high voltage direct current system according to one of claims 8 to 10 wherein the amount of d.c. current reference reduction is determined depending on the reactive power spent by the high voltage direct current system when the operation mode thereof is changed.

* * * * *